(12) United States Patent
Dupré

(10) Patent No.: US 6,690,930 B1
(45) Date of Patent: Feb. 10, 2004

(54) PROCESS TO CONTROL A SUBSCRIBER IDENTITY MODULE (SIM) IN MOBILE PHONE SYSTEM

(75) Inventor: Michael Dupré, Sankt Augustin (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 09/463,786

(22) PCT Filed: May 25, 1999

(86) PCT No.: PCT/DE99/01531

§ 371 (c)(1),
(2), (4) Date: Apr. 11, 2000

(87) PCT Pub. No.: WO99/62275

PCT Pub. Date: Dec. 2, 1999

(30) Foreign Application Priority Data

May 26, 1998 (DE) .......................................... 198 23 532

(51) Int. Cl.⁷ ................................................ H04M 1/66
(52) U.S. Cl. ........................ 455/411; 455/558; 455/557
(58) Field of Search ................................ 455/411, 558, 455/557, 407, 550, 410, 415, 418, 575, 563; 380/10, 247, 248, 249, 23, 29, 211, 283, 273, 282; 235/380–384; 379/58, 59, 355, 356, 357, 550, 558, 563, 564, 144; 713/200

(56) References Cited

U.S. PATENT DOCUMENTS

| | | | | |
|---|---|---|---|---|
| 5,036,461 A | * | 7/1991 | Elliott et al. ................. | 364/408 |
| 5,310,999 A | * | 5/1994 | Claus et al. ................. | 235/384 |
| 5,742,910 A | * | 4/1998 | Gallant et al. .............. | 455/550 |
| 5,878,135 A | * | 3/1999 | Blatter et al. ................. | 380/10 |
| 5,915,226 A | * | 6/1999 | Martineau .................... | 455/558 |
| 6,073,238 A | * | 6/2000 | Drupsteen .................... | 713/200 |
| 6,198,823 B1 | * | 3/2001 | Mills .......................... | 380/247 |
| 6,240,187 B1 | * | 5/2001 | Lewis ......................... | 380/282 |
| 6,373,946 B1 | * | 4/2002 | Johnston ..................... | 380/211 |

FOREIGN PATENT DOCUMENTS

| | | | | |
|---|---|---|---|---|
| DE | 0757502 A2 | * | 2/1997 | ............ H04Q/7/38 |
| EP | 0 757 502 |   | 2/1997 | ............ H04Q/7/38 |
| WO | 92/12584 |   | 7/1992 | ............ H04K/1/00 |

* cited by examiner

Primary Examiner—Edward F. Urban
Assistant Examiner—C. Chow
(74) Attorney, Agent, or Firm—The Maxham Firm

(57) ABSTRACT

A process to control a subscriber identity module (SIM) in mobile phone systems. The process consists of the mobile phone network sending one or more specific control values to the subscriber identity module that initiate specific actions or procedures within the subscriber identity module. Certain random values sent by the mobile phone network to the subscriber identity module for regular authentication purposes are used as control values (Control RANDs).

13 Claims, 2 Drawing Sheets

PROCESS TO CONTROL A SUBSCRIBER IDENTITY MODULE (SIM) IN MOBILE PHONE SYSTEM

FIELD OF INVENTION

The invention pertains to a process to control a subscriber identity module (SIM) in mobile phone systems.

DISCUSSION OF RELATED ART

Mobile stations consist of a mobile phone terminal that assumes all radio and transmission functions and a subscriber identity module (SIM) associated with it. Most SIM's are in the form of a chip card that establishes the subscriber relationship with the mobile phone system operator. Important individual subscriber data saved on the SIM facilitate the use of the mobile phone services. The SIM contains the mobile subscriber identification (IMSI), the secret individual subscriber key (Ki) an authentication algorithm (A3), a ciphering key generating algorithm (A8), a personal identification number (PIN) and other permanent and temporary data.

The SIMS are personalized with an IMSI, Ki, etc., ahead of time at a "personalization" center run by the mobile phone network operator and are then issued to the subscribers. A change to the permanent data saved on the SIM, to update procedures or make security-related improvements, for example, is usually no longer possible or can only be done at the personalization center. If the SIM data is to be changed for a large number of subscribers, this can become very labor- and cost intensive.

A primary purpose of the invention is to present a process to control a subscriber identity module (SIM) for mobile phone systems which meets high security requirements and which is easy to implement.

The invention consists of a process in which the mobile phone network sends one or more distinct control values to the subscriber identity module. These values then initiate certain actions or procedures within the subscriber identity module. Certain random values sent from the mobile phone network to the subscriber identity module for regular authentication are used as the control values (Control RANDs).

Prior to initiating an action or procedure in the subscriber module, a test of these received control values (Control RAND) is performed in which the control values are compared to certain comparison values available on the SIM (Comparison RANDs). There is at least one comparison value saved on the SIM either as a permanent parameter or that can be calculated. For example, Control/Comparison RANDs can be generated specific to each card by evaluating them as a function of the secret key Ki and/or other permanently stored parameters Z using the A3/A8 security algorithms implemented in the SIM.

In order to perform the comparison quickly, the comparison value can be stored on the SIM.

Also, each SIM must have more than one control value reserved for it. Each value must initiate a certain action or procedure on the SIM. A series of allowable control values is maintained at a suitable point in the mobile phone network, for example, at the authentication center (AC). Each of these control values is assigned to a particular SIM with particular actions to be initiated.

To raise the security in the mobile phone network, many different A3/A8 security algorithms can be stored on the SIM. These algorithms can be alternated by receiving the correct control value.

It is also possible to store a number of secret keys Ki on the SIM card or to derive them from a single stored Ki. Receiving the correct control value can allow these keys to be alternated.

Each initiated action or procedure can be initiated not only by a single Control RAND, but also by a Control RAND that is part of a group of Control RANDS. Only a portion of the Control RAND is used, which allows subsequent Control RANDs to differ from one another but have the same control bits.

An advantage of this invention is that no additional control values, which could otherwise be easily identified and misused, need to be transferred for this type of 'remote control' of actions or procedures on the SIM. Using a random number that is transferred during every authentication as a control value renders it unidentifiable. The control values appear as "common" RAND values that are sent by the network to the SIM for authentication. Also, there is no need to change the GSM protocols.

The following describes the invention in more detail with the help of an embodiment example. More features and advantages of the invention are included.

BRIEF DESCRIPTION OF THE DRAWING

The above advantages will be more readily appreciated from the following detailed description when read in conjunction with the accompanying drawing, wherein.

DETAILED DESCRIPTION OF THE PREFERRED EMBODIMENT

Figure 1:
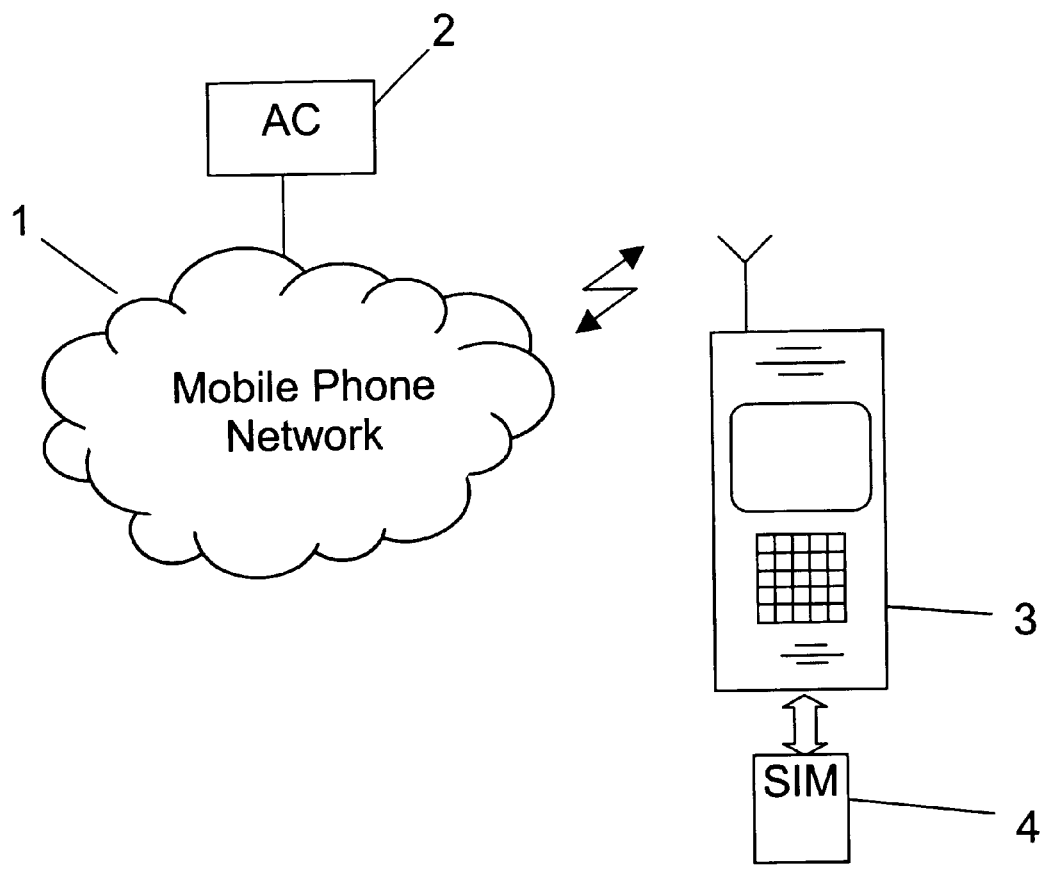
FIG. 1 is a diagrammatic illustration of a mobile phone network including an authentication center interacting with a mobile phone terminal in accordance with the present invention.
Figure 2:
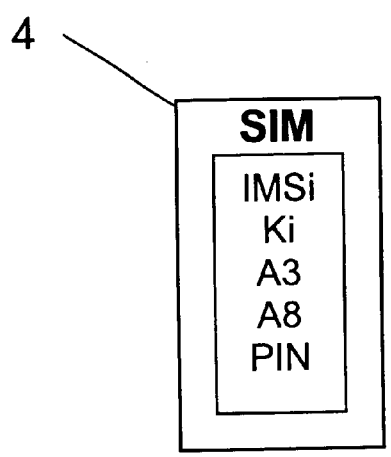
FIG. 2 is an illustration of a subscriber identity module (SIM) showing values and algorithms contained on it.

With reference now to the drawing, and more particularly to FIGS. 1 and 2, the authentication procedure within GSM mobile phone system 3 is done by authentication center (AC) 2 of mobile phone network 1. The AC sends a random number RAND through network 1 and system 3 to SIM 4, which then calculates a result SRES=A3/A8 (Ki, RAND) using an A3/A8 algorithm and the secret key Ki. The SIM then sends the result back to AC 2. The AC also knows with the secret key Ki is. It calculates a value SRES using the same A3/A8 algorithm and compares this value with the SRES provided by the SIM. If the two values agree, the SIM is authenticated.

The SIM card contains two or more different A3/A8 algorithms with the same external interfaces for identical-length RAND, Ki and SRES. The SIM can have only one Ki here or else each A3/A8 algorithm must have its own Ki associated with it.

Figure 3:
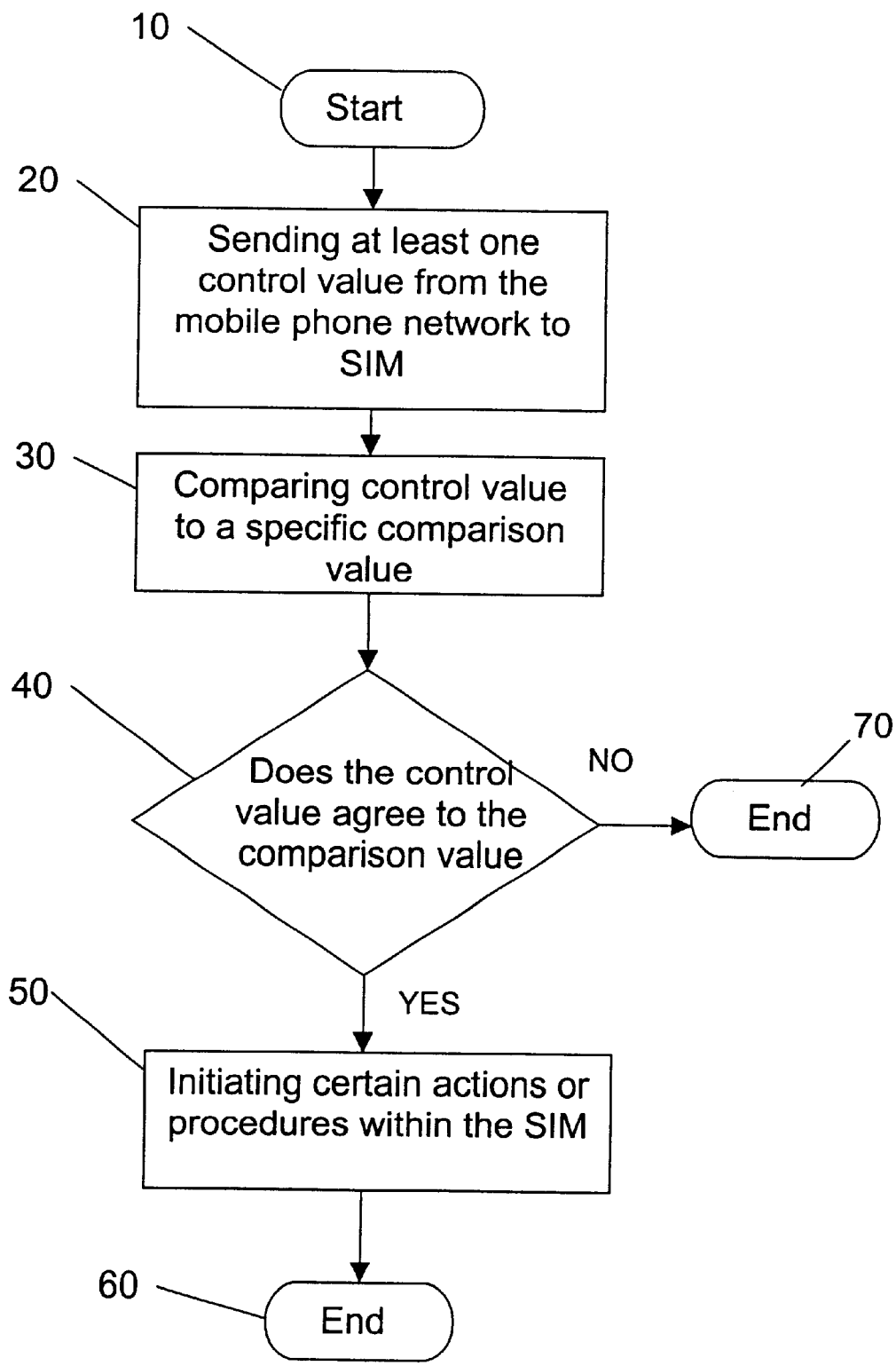
FIG. 3 is a flow diagram illustrating the process of the present invention.

Operation of the process as illustrated in FIG. 3 begins at block 10. If the network would like to change the algorithm A3/A8 for security reasons, he can have authentication AC) 2 produce a special random number RAND at block 20 that simultaneously represents a control value according to the invention, which is also called the Control RAND below. The Control RAND initiates a switching of the A3/A8 algorithm in the SIM card. The AC has already calculated the values for SRES for the authentication based on the new algorithm applied to the Control RAND. Thus, on the one hand, the Control RAND serves as regular authentication of the SIM and on the other hand it serves to switch the A3/A8 cipher algorithm used.

A RAND serving as a Control RAND should be specific to the card and should be secure. For example, the value resulting from A3/A8 (Ki, Ki) can be used as the Control RAND. The value A3/A8 (Ki, Ki) is card-specific and is not known by anyone who does not know the Ki. In calculating with a random number RAND for control functions, the Ki is used that is only known to the SIM and to the network. It is sufficient to control with only a portion of this value Ki. In this way, not all of the bits of this value need to be used. Then, every RAND whose first n bits agree with those of the value A3/A8 (Ki, Ki) is a Control RAND.

The value A3/A8 (Ki, Ki) can be calculated and safely stored when the card is personalized. Prior to each authentication, the bits of the RAND sent by the AC that are not used are masked out, and the result is compared in block 40 to the value of the Control RAND calculated and securely stored at the SIM. If the comparison value calculated by the card agrees with the received Control RAND at block 30, the Control RAND is authenticated and, as indicated at block 50, can initiate the associated actions or procedures on the SIM, and the operation ends at block 60. If the A3/A8 algorithm has already been changed, a normal authentication procedure ensues. Another Control RAND received from the same Control RAND group is no longer recognized, and the operation ends at block 70.

In general, the random number RAND that the AC produces and sends to the SIM for authentication is a pure random number. As long as the number n of the bits of a Control RAND that are used is large enough, it is not necessary to test as to whether the randomly produced RAND is a reserved Control RAND or not. If the value n is chosen very large, it is improbable that the AC will randomly produce a RAND for everyday authentication that agrees with a reserved Control RAND.

If the algorithm is to be changed, the AC should perform authentications a number of times in succession using Control RANDS in order to ensure that the SIM indeed receives this Control RAND in case there are connection problems.

If an authentication is made through a Visitor Location Register (VLR) visitor file, it will re-use its old authentication triplet obtained from the Home Location Register (HLR), and at some time will encounter the Control RAND predetermined by the HLR or AC 2. The VLR does not know that this is a Control RAND. At that point, the SIM switches the algorithm. Thus, under certain circumstances, the time of the switch at the SIM is much later than the time of the switch at the AC. However, if the subscriber changes his VLR within his home network, the RAND/SRES values stored in the last VLR are assumed and re-used. Thus, one or more VLR changes are not critical and do not delay the switching of the algorithm in the SIM.

The secret key Ki can be changed in the SIM according to the same process. The new Ki can be securely stored on the SIM or be derived from the old Ki by a defined calculation process.

The Control RANDs needed to switch the Ki have different values than the Control RAND to switch the A3/A8 algorithms and can be derived from another mathematical process, for example. A Control RAND can consist of the first n bits of the result from A3/A8 (Ki, Ki XOR Z) with z being an arbitrary but fixed value that is stored on SIM 4.

The AC must continue to operate using the new Ki right after producing the first Control RAND. The SIM also uses the new Ki right away for authentication, which should also be carried out when the Control RAND is received.

In view of the above description it is likely that modifications and improvements will occur to those skilled in this technical field which are within the scope of this invention. Accordingly, the invention is to be interpreted in accordance with the attached claims and reasonable equivalents thereof.

What is claimed is:

1. A process to control a subscriber identity module (SIM) in mobile phone systems, the process comprising:

sending at least one distinct Control RAND to the subscriber identity module by means of the mobile phone system;

initiating non-authentication actions or procedures within the subscriber identity module using the at least one Control RAND; and using the at least one Control RAND for regular authentication of the subscriber identity module in the mobile phone system.

2. The process according to claim 1, wherein a group of different Control RANDs is used to initiate an action or procedure.

3. The process according to claim 1, wherein the at least one Control RAND initiates a number of different actions or procedures.

4. The process according to one of claims 1–3, and further comprising:

testing the received Control RANDs in the subscriber module prior to initiating an action or procedure by comparing the Control RANDs to specific comparison values (Comparison RAND's) available in the SIM.

5. The process according to claim 4, wherein the comparison values are stored permanently on the SIM.

6. The process according to claim 4, wherein the comparison values are calculated using data stored in the SIM.

7. The process according to claim 4, wherein the comparison value is derived using the security algorithm A3/A8 implemented in the SIM as a function of the secret key Ki and/or other stored fixed parameters Z.

8. The process according to one of claims 1–3, wherein for each SIM, a number of control values are reserved that each initiate a particular action or a particular procedure on the SIM.

9. The process according to one of claims 1–3, wherein a series of allowable Control RANDs is reserved at a suitable point in the mobile phone network and that each of these is allocated to a specific SIM and specific actions.

10. A subscriber identity module (SIM) to be used for the process according to one of claims 1 trough 3, wherein at least one comparison value (Comparison RAND) is securely stored on it or can be calculated using data stored on it.

11. The subscriber identity module (SIM) according to claim 10, wherein a comparison value is derived using the A3/A8 security algorithms implemented in the SIM as a function of the secret key Ki and/or other fixed stored parameters Z.

12. The subscriber identity module (SIM) according to claim 10, wherein a number of different A3/A8 security algorithms are stored on the SIM which can be alternated by receiving a correct Control RAND.

13. The subscriber identity module (SIM) according to claim 10, wherein a number of secret keys Ki are stored on the card or can be derived from one Ki stored there, and that these different keys can be alternated by receiving a correct Control RAND.

* * * * *